United States Patent [19]

Steele

[11] Patent Number: 4,458,588
[45] Date of Patent: Jul. 10, 1984

[54] DUMPING TRANSPORT VEHICLE FOR HARVESTED COTTON HAVING PACKER-DIVIDER

[75] Inventor: Billy S. Steele, Corpus Christi, Tex.

[73] Assignee: E. L. Caldwell & Sons, Inc., Corpus Christi, Tex.

[21] Appl. No.: 279,232

[22] Filed: Jun. 30, 1981

[51] Int. Cl.³ .............................. B30B 7/04; B60P 1/16
[52] U.S. Cl. .................................... 100/100; 100/209; 100/218; 100/233; 298/8 H; 298/10; 414/471; 414/493
[58] Field of Search .................. 414/525 R, 471, 493, 414/497; 100/209, 233, 218, 100; 298/8 R, 8 H, 10, 18

[56] References Cited

U.S. PATENT DOCUMENTS

| | | | |
|---|---|---|---|
| 3,215,291 | 11/1965 | Nickla | 414/525 R |
| 3,703,966 | 11/1972 | Jones et al. | 100/233 |
| 4,070,962 | 1/1978 | Peterson | 100/209 |
| 4,148,527 | 4/1979 | Steele | 298/10 |

FOREIGN PATENT DOCUMENTS 612657 6/1978 U.S.S.R. ................................ 298/10

Primary Examiner—David A. Scherbel
Assistant Examiner—Donald Hajec
Attorney, Agent, or Firm—B. P. Fishburne, Jr.

[57] ABSTRACT

A dumping transport vehicle for harvested cotton bolls has the capacity to receive in its basket body two dumps from a large self-propelled harvester. An internal power-operated pivoted packer-divider panel of the vehicle enables compacting of the first dump received from the harvester against the dump-out side of the vehicle basket so that the second dump from the harvester can be adequately received in the vehicle basket. The packer-divider panel also enables a two-stage dumping of the contents of the fully loaded vehicle basket into a module builder which is unable to handle and pack the entire volume of harvested cotton in the vehicle basket in a single delivery or dump.

1 Claim, 7 Drawing Figures

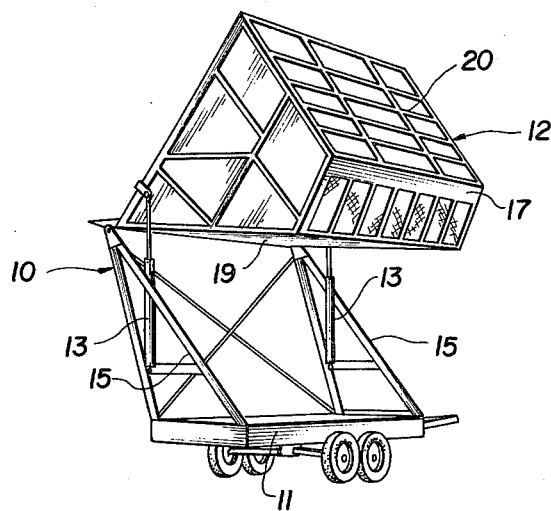
FIG.1
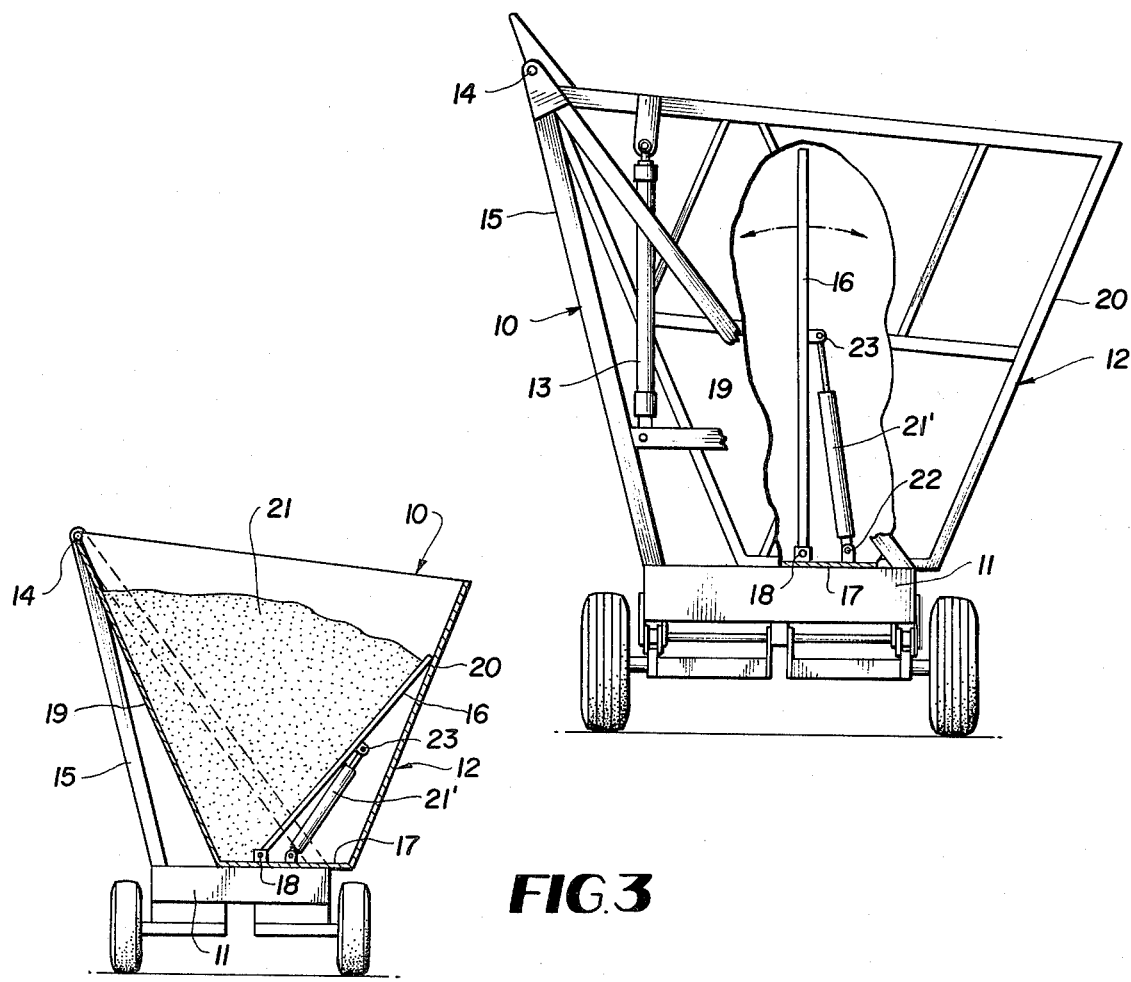
FIG.2
FIG.3

DUMPING TRANSPORT VEHICLE FOR HARVESTED COTTON HAVING PACKER-DIVIDER

BACKGROUND OF THE INVENTION

This invention relates to that type of dumping transport vehicle for harvested cotton disclosed in U.S. Pat. No. 4,148,527 and constitutes an improvement thereon.

Current practice requires that the dumping basket body of the transport vehicle has its volumetric capacity substantially increased from about 850 to 1500 cubic feet so that the basket body can receive and hold two complete dumps from a large self-propelled harvester which delivers 800 cubic feet of cotton per dump or transfer into the transport vehicle basket.

It was discovered by actual testing in the field that due to the physical characteristics of harvested cotton bolls the first dump from the harvester into the vehicle basket will not spread out sufficiently in the basket to allow the complete entry of the second dump from the harvester. It was discovered that a large space on the dump-out side of the vehicle basket was not being utilized.

A second problem is created by increasing the volumetric capacity of the vehicle basket in that the entire load of harvested cotton in the basket cannot be handled by the module builder into which the dumping transport vehicle delivers the cotton. The module builder simply cannot handle and pack such a large volume of cotton delivered in one dump from te vehicle, and it was determined that to enable the module builder to keep up with the harvester the load from the transport vehicle dumping basket would have to be divided into two portions dumped separately and sequentially into the module builder.

Both of these problems are completely solved by the main feature of this invention by providing within the vehicle dumping basket a front-to-rear pivoted and power-operated packer-divider panel which enables the basket to accept the first dump of cotton bolls from the harvester and compact this cotton against the dump-out side of the basket so that the second dump from the harvester can be readily received. The packer-divider panel can then compact the second dump or load from the harvester against the dump-in side of the basket. Following this, the portion of the total load of the basket adjacent to the dump-out side can first be delivered into the module builder, following which the second portion of the load can be dumped or delivered following an adjustment of the packer-divider panel toward the dump-out side of the basket.

BRIEF DESCRIPTION OF THE DRAWINGS

FIG. 1 is a perspective view of a dumping transport vehicle for harvested cotton bolls according to the invention.

FIG. 2 is an end elevational view of the vehicle, partly broken away, with the dumping basket in a down or nondumping position.

FIG. 3 is a partly schematic transverse sectional view through the vehicle showing the acceptance into the basket of a first dump or load from a harvester.

DETAILED DESCRIPTION

Figure 4:
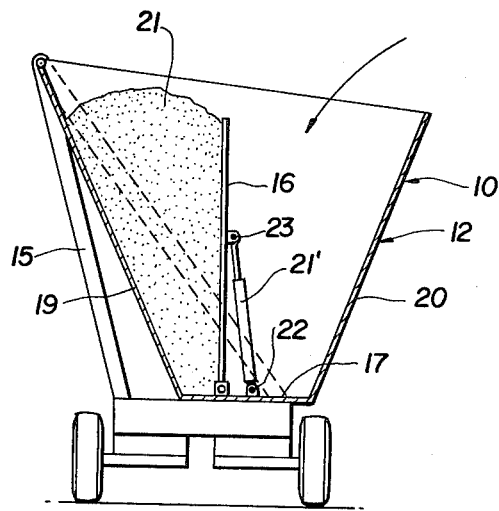
FIG. 4 is a view similar to FIG. 3 showing compacting of the first load within the basket.

Referring to the drawings in detail wherein like numerals designate like parts, a dumping transport vehicle 10 for harvested cotton bolls is depicted having a wheeled bed frame 11, a dumping basket body 12 and dumping cylinders 13 for the control of the basket body which is pivoted at 14 to rising triangular end frames 15 on the bed frame 11. Except for increased volumetric capacity of the dumping basket 12 and the provision therein of a packer-divider panel 16 to be fully described and forming the heart of this invention, the construction and general mode of operation of the dumping transport vehicle is essentially as disclosed in U.S. Pat. No. 4,148,527 and therefore need not be described in great detail herein for a proper understanding of the device.

The packer-divider panel 16 rises from the floor 17 of basket 12 and extends longitudinally of the basket 12 between the front and rear vertical walls thereof, the terms "front" and "rear" being made in reference to the longitudinal axis of the wheeled bed frame 11. The lower end of the packer-divider panel is pivoted as at 18 to the floor of the basket 12 at a location closer to the sloping dump-out side 19 of the basket than to the opposing dump-in side 20 thereof. The terms "dump-out side" and "dump-in side" are chosen to designate, respectively, the side walls of the basket 12 adjacent to which cotton is dumped from the basket 12 into a module builder and cotton from a large self-propelled harvester is dumped into the basket 12 in the field.

When in a vertical position, FIG. 2, the panel 16 extends close to the open top of the basket 12. At proper times, the packer-divider panel is swung on the axis of pivot 18 toward or away from the respective basket sides 19 and 20 by a pair of power cylinders 21' connected between the basket floor 17 and one side of the panel 16 at approximately its midpoint, these connections being indicated at 22 and 23 in the drawings.

The mode of operation of the device can best be described and understood with reference to FIGS. 3 through 7 sequentially. Referring to FIG. 3, the packer-divider panel 16 is swung by the cylinders 21' toward and against the basket dump-in side 20 and the first load 21 of cotton from the harvester is dumped into the basket 12 and will settle between the dump-out side 19 and the panel 16. The basket 12 is in the down nondumping position with its floor 17 resting on the horizontal bed frame 11.

Referring to FIG. 4, the panel 16 is now swung by the cylinders 21' to compress the first load 21 of cotton between it and the dump-out side 19 to make adequate room for the second delivery of cotton from the harvester into the space between the panel 16 which is generally upright and the dump-in side 20.

Figure 5:
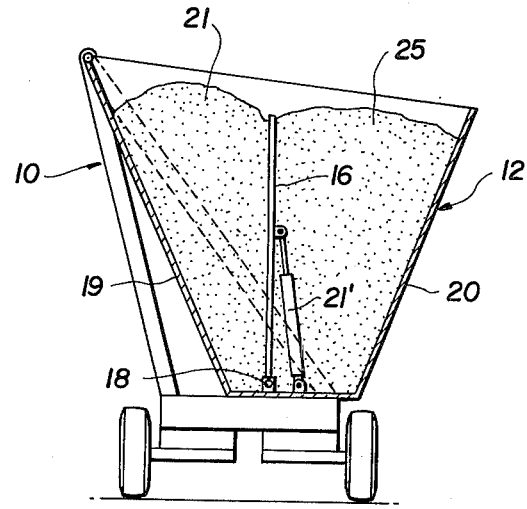
FIG. 5 is a similar view showing acceptance of a second load from the harvester.

The second dumping of cotton from the harvester into the basket 12 now takes place as indicated by the arrow in FIG. 4 to complete the filling of the basket, the additional cotton being shown in FIG. 5. The packer-divider panel 16 is now swung toward the dump-in side 20 to compact the second load or portion 25. This will allow dumping of the first load or portion 21 into the module builder by the basket 12 while the panel 16 holds back the second load or portion 25 in the compacted state, the pressure of the panel on the first load 21 being relieved.

Figure 6:
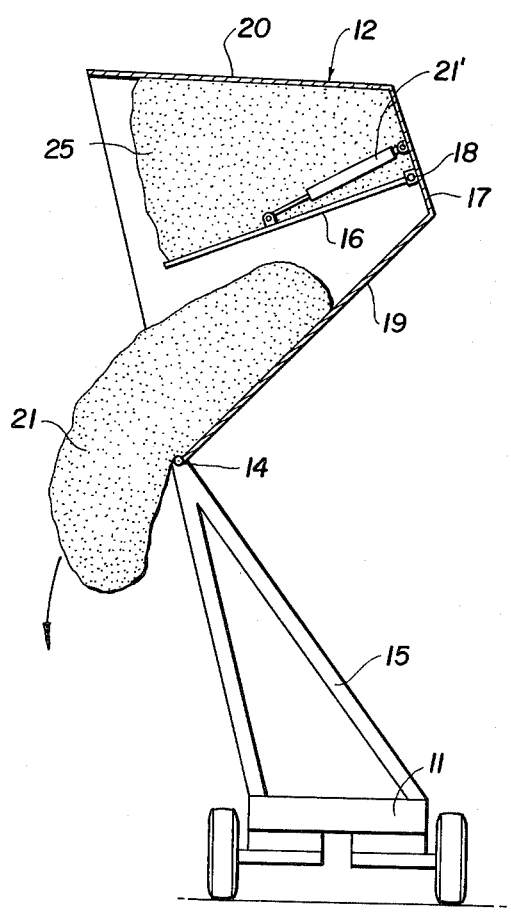
FIG. 6 is a partly schematic end elevation of the vehicle depicting dumping of the first load or load portion from the basket into a module builder.

FIG. 6 illustrates the act of dumping the first load or portion 21 into the module builder, not shown, after the basket 12 has been elevated to the dumping position by the two cylinders 13 in the manner described in U.S. Pat. No. 4,148,527.

Figure 7:
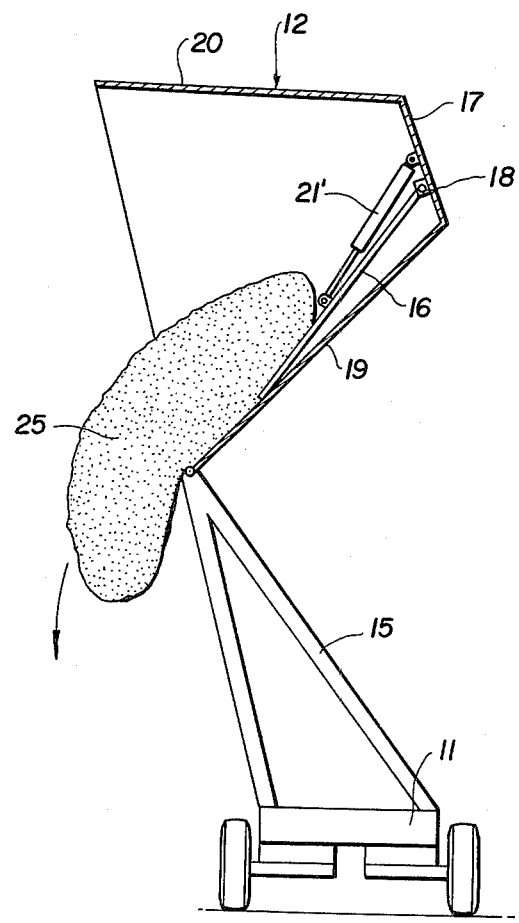
FIG. 7 is a similar view showing the dumping of the second load portion into the module builder.

Following this, the packer-divider panel 16 is swung toward the dump-out side 19 of the basket to remove compacting pressure on the second load 25, FIG. 7, in order to allow the easy dumping of the second load component into the module builder, as illustrated.

The mechanism involved to facilitate the two stage filling of the basket 12 with harvested cotton, compacting of the first and second load portions in the basket, and the subsequent two stage dumping into a module builder, is extremely simple, compact, economical to manufacture and reliable. The arrangement completely solves the two aforementioned problems occasioned by the enlarged capacity of the basket 12 of the dumping transport vehicle.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. An apparatus for receiving two dumps of cotton from a cotton harvester and transporting the cotton to a module builder where the two dumps of cotton are delivered separately and sequentially from the apparatus into the module builder, the apparatus comprising a wheeled low elevation substantially level transport base, an elevated support frame fixed on the transport base and rising above one side thereof to define an elevated pivot axis longitudinally of the transport base substantially above and along one side thereof, an open top coverless receiving and dumping receptacle for cotton on the transport base and having a bottom wall which can rest upon the transport base and two upwardly divergent side walls interconnected by two substantially vertical end walls near the ends of the transport base, one of said receptacle side walls extending substantially to the elevation of said pivot axis and said receptacle being pivotally secured to the top of said elevated support frame on said pivot axis whereby the receptacle can be rotated from a non-dumping down substantially level position to an elevated partly inverted dumping position, a first power cylinder connected between said elevated support frame and said receptacle for rotating the receptacle on said pivot axis between the non-dumping and dumping positions, a one-piece packer-divider panel lying in one plane within said receptacle between said side walls and having its bottom edge pivotally secured to the bottom wall of said receptacle between and in spaced relationship to the side walls of the receptacle, the packer-divider panel extending substantially between end walls of the receptacle and having its top edge extending near the top of the receptacle when the packer-divider panel is in an intermediate substantially upright position, the packer-divider panel dividing the receptacle into a pair of separated receiving, compressing and dumping compartments, a second power cylinder disposed within one of said compartments of the receptacle and being connected between said bottom wall of the receptacle and one side of the packer-divider panel and being operable to swing the packer-divider panel on its pivot axis selectively toward and away from said side walls of the receptacle, whereby cotton can be sequentially received in, compressed and then released and dumped from each compartment of the apparatus.

* * * * *